(12) United States Patent
Husband et al.

(10) Patent No.: US 8,169,756 B2
(45) Date of Patent: *May 1, 2012

(54) FAULT CURRENT LIMITING

(75) Inventors: Stephen M Husband, Derby (GB); David R Trainer, Derby (GB)

(73) Assignee: Rolls-Royce plc, London (GB)

( * ) Notice: Subject to any disclaimer, the term of this patent is extended or adjusted under 35 U.S.C. 154(b) by 268 days.

This patent is subject to a terminal disclaimer.

(21) Appl. No.: 12/607,211

(22) Filed: Oct. 28, 2009

(65) Prior Publication Data

US 2010/0046125 A1 Feb. 25, 2010

Related U.S. Application Data

(63) Continuation-in-part of application No. 11/727,544, filed on Mar. 27, 2007, now Pat. No. 7,649,721.

(30) Foreign Application Priority Data

Mar. 29, 2006 (GB) .................................. 0606349.9

(51) Int. Cl.
   *H02H 7/00* (2006.01)
(52) U.S. Cl. .............................. 361/19; 361/141; 361/58
(58) Field of Classification Search ..................... 361/19, 361/141, 58
   See application file for complete search history.

(56) References Cited

U.S. PATENT DOCUMENTS

| | | | |
|---|---|---|---|
| 2,161,179 A | 6/1939 | Logan | |
| 4,152,637 A * | 5/1979 | Oberbeck et al. | 323/250 |
| 4,158,864 A * | 6/1979 | Kennon | 361/58 |
| 4,206,434 A * | 6/1980 | Hase | 336/5 |
| 6,751,075 B2 * | 6/2004 | Cha | 361/19 |
| 2006/0158803 A1 * | 7/2006 | Friedman et al. | 361/58 |

FOREIGN PATENT DOCUMENTS

| | | |
|---|---|---|
| GB | 998226 A | 7/1965 |
| WO | 2004068670 A1 | 8/2004 |

OTHER PUBLICATIONS

European Search Report, Jun. 19, 2006.
http://www.smartgridnews.com/artman/uploads/1/000000000001017793.pdf (see particularly chapter 2 on Shielded-Core SCFL and Saturable-Core SFCL).

* cited by examiner

*Primary Examiner* — Jaren Fureman
*Assistant Examiner* — Nicholas Ieva
(74) *Attorney, Agent, or Firm* — Jeffrey S. Melcher; Manelli Selter PLLC

(57) ABSTRACT

An alternating current system 10 has a primary circuit 11 which forms a primary winding 18 on a core 16. A secondary winding 24 is connected with a current source 26 or, alternatively, with an impedance 60. The core 16 is threaded by a superconducting coil 20 having a current source 22. In normal use, current in the coil 20 provides a DC bias level of flux in the core 16, and the source 26 is varied to maintain substantially constant flux, thereby minimising losses in the primary circuit 11. In fault conditions, current in the coil 20 is reduced or removed to increase voltage losses across the coil 18, thereby limiting fault current. The impedance 60 can also be switched into circuit, creating further current limiting by virtue of the transformer effect of the windings 18, 24.

17 Claims, 3 Drawing Sheets

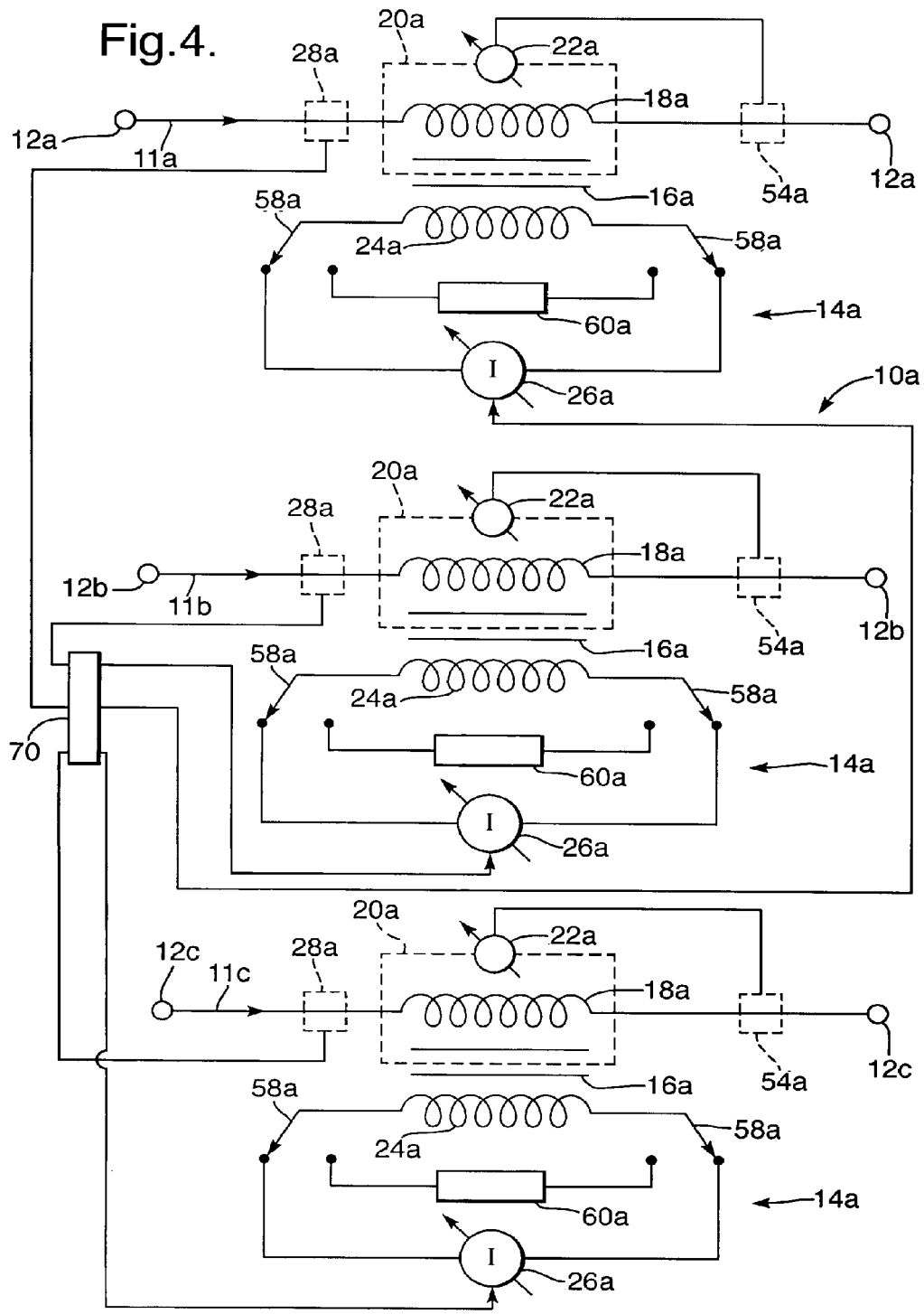

FAULT CURRENT LIMITING

This application is a Continuation-in-Part of U.S. patent application Ser. No. 11/727,544, filed 27 Mar. 2007 now U.S. Pat. No. 7,649,721, and claims priority to United Kingdom Patent Application Serial No. 0606349.9, filed 29 Mar. 2006, the complete disclosures of which are incorporated herein by reference.

FIELD OF THE INVENTION

The present invention relates to fault current limiting. In particular, but not exclusively, the invention relates to limitation of fault currents within electrical distribution systems.

BACKGROUND OF THE INVENTION

Fault conditions within electrical distribution systems have the potential for creating high fault current levels. Electrical distribution systems must either be designed to be capable of handling high fault current levels, or must employ current limiting devices to reduce or limit fault currents and their consequences, until the fault is isolated, for example by switchgear.

SUMMARY OF THE INVENTION

In one aspect, the present invention provides a fault current limiting arrangement, comprising:
  a primary circuit for current to be limited in the event of a fault,
  a core having a primary winding forming part of the primary circuit;
  a coil coupled with the core, and a DC current supply for the coil, to provide a bias level of flux in the core;
  an auxiliary winding coupled with the core;
  and an auxiliary current source for the auxiliary winding, the output of the auxiliary current source being adjustable in response to changes at the primary winding to apply control to the primary winding by control of the flux within the primary winding.

Preferably, the coil comprises a superconducting element. The coil current supply is preferably operable, in use, to set the coil current to saturate the core. The coil current supply is preferably operable, in use, to change the coil current in response to a fault condition occurring in the primary circuit. The coil current supply is preferably operable to remove the coil current in response to a fault condition.

The auxiliary current source may be operable to control the auxiliary current to maintain substantially constant flux within the primary winding, during use, except during fault conditions. The primary circuit is preferably connected with one phase of a multi-phase electrical system, the auxiliary current source being operable to control the auxiliary current to change the primary winding flux, thereby enabling a controllable inductance that can provide VAR compensation. The auxiliary circuit may include impedance for switching into circuit during fault conditions.

The core preferably has a relatively thin arm on which the primary winding is wound, and a relatively thick arm on which the auxiliary winding is wound. In use, the bias level of flux provided by the coil is preferably sufficient to saturate the relatively thin arm and is insufficient to saturate the relatively thick arm in the presence of current in the primary or auxiliary windings.

In another aspect, the present invention provides a method of fault current limiting in which:
  a core is provided having a primary winding forming part of a primary circuit;
  a coil is coupled with the core, and provided with DC current to provide a bias level of flux in the core;
  an auxiliary winding is coupled with the core;
  and current is provided for the auxiliary winding and adjusted in response to changes at the primary winding to apply control to the primary winding by control of the flux within the primary winding.

Preferably, the coil comprises a superconducting element. The coil current supply preferably sets the coil current to saturate the core. The coil current preferably changes in response to a fault condition occurring in the primary circuit. The coil current is preferably removed in response to a fault condition.

The auxiliary winding current is preferably controlled to maintain substantially constant flux within the primary winding, during use, except during fault conditions. If the primary circuit is connected with one phase of a multi-phase electrical system, the auxiliary winding current may be used to control the auxiliary current to change the primary winding flux, thereby to provide VAR compensation.

In another aspect, the present invention provides a fault current limiting arrangement, comprising:
  a primary circuit for current to be limited in the event of a fault,
  a core having a primary winding forming part of the primary circuit;
  a coil coupled with the core, and a DC current supply for the coil, to provide a bias level of flux in the core; wherein the coil current supply is operable, in use, to change the coil current in response to a fault condition occurring in the primary circuit.

The coil current supply is preferably operable to remove the coil current in response to a fault condition. Preferably, the coil comprises a superconducting element. The coil current supply is preferably operable, in use, to set the coil current to saturate the core.

The auxiliary current source may be operable to control the auxiliary current to maintain substantially constant flux within the primary winding, during use, except during fault conditions. The primary circuit is preferably connected with one phase of a multi-phase electrical system, the auxiliary current source being operable to control the auxiliary current to change the primary winding flux, thereby to provide VAR compensation. The auxiliary circuit may include impedance for switching into circuit during fault conditions.

The core preferably has a relatively thin arm on which the primary winding is wound, and a relatively thick arm on which the auxiliary winding is wound. In use, the bias level of flux provided by the coil is preferably sufficient to saturate the relatively thin arm and is insufficient to saturate the relatively thick arm in the presence of current in the primary or auxiliary windings.

In another aspect, the present invention provides a method of fault current limiting, in which:
  a core is provided with a primary winding forming part of a primary circuit for current to be limited in the event of a fault,
  a coil is coupled with the core, and provided with a DC current to provide a bias level of flux in the core; and
  the coil current is changed in response to a fault condition occurring in the primary circuit.

The coil current is preferably removed in response to a fault condition. Preferably, the coil comprises a superconducting element. The coil current supply is preferably set to saturate the core.

The auxiliary winding current is preferably controlled to maintain substantially constant flux within the primary winding, during use, except during fault conditions. If the primary circuit is connected with one phase of a multi-phase electrical system, the auxiliary winding current may be used to control the auxiliary current to change the primary winding flux, thereby to provide VAR compensation.

BRIEF DESCRIPTION OF THE DRAWINGS

Examples of the present invention will now be described in more detail, by way of example only, and with reference to the accompanying drawings, in which:

FIG. 4 is a schematic diagram, corresponding with FIG. 1, illustrating a three phase system.

FIG. 1 is a schematic diagram of an alternating current system 10 having a conductor 11 between terminals 12. Alternating voltages and currents $V_a$ and $i_a$ arise, in use, within the system 10. The system 10 may be, for example, an electrical distribution system.

The system 10 has a fault current limiting arrangement 14. The conductor 11, between the terminals 12, forms a primary circuit within the arrangement 14, being the circuit within which current is to be limited in the event of a fault. That is to say, when the electrical distribution system represented by the conductor 11 experiences a fault, the resulting fault currents in the conductor 11 are to be limited by the arrangement 14, until other control arrangements, such as isolators, can come into circuit to isolate the fault.

Figure 1:
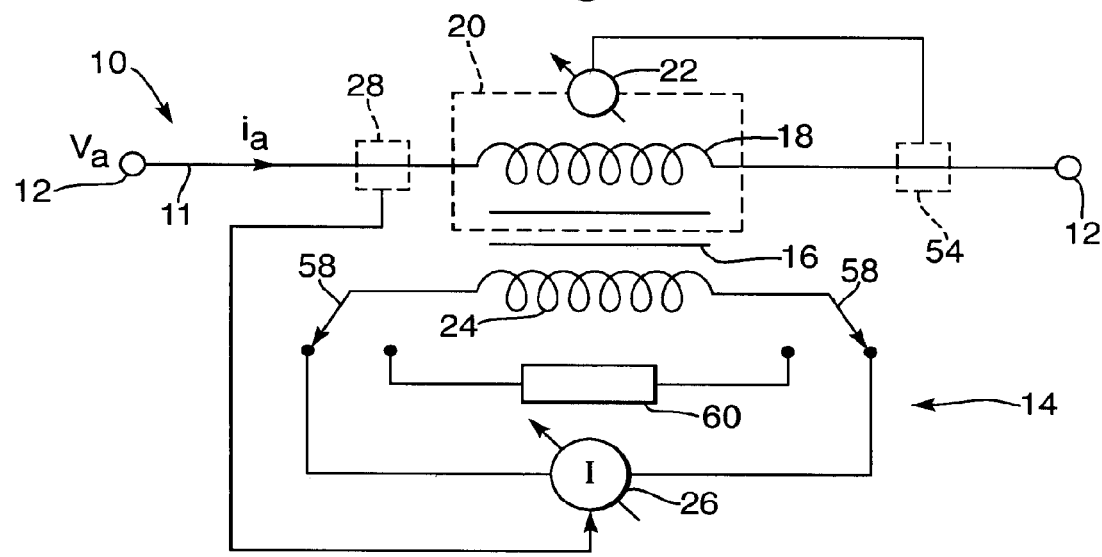
FIG. 1 is a schematic diagram of an electrical system with fault current limiting arrangements in accordance with the present invention.

The arrangement 14 has a core 16 of iron or other magnetic material, illustrated schematically by parallel lines in FIG. 1. The conductor 11 forms a primary winding 18 on the core 16.

A coil 20 threads the core 16 and is therefore coupled with the core. A DC current supply 22 for the coil 20 causes the coil 20 to provide a bias level of flux in the core 16.

An auxiliary winding 24 is coupled with the core 16 and has an auxiliary current source 26. The auxiliary current source is typically a DC pulse width modulating power unit with a smoothing capacitor. Alternatively it is a linear power supply, battery, fuel cell, diesel generator or any other small prime mover generator. The output of the current source 26 is controlled by a controller (not shown). A preferred type of controller is a voltage-current controller that receives the voltage and current of the primary circuit as inputs, for example from a detector 28, and outputs the required auxiliary current in order to control the flux within the primary winding 18. The output of the current source 26 is adjustable in response to changes at the primary winding 18, detected at 28 by current through the conductor 11, the voltage across the winding 18 or flux in the core 16. The output of the source 26 is adjusted, in use, in response to changes at the primary winding 18, to apply control to the primary winding 18 by control of the flux within the primary winding 18, as will be described.

The auxiliary winding 24 and its current source 26 provide fine adjustment of the output voltage by regulating the magnetic flux in the core 16. The DC supply 22 for the coil 20 provides coarse adjustment. Preferentially, the controller outputs control signals to control both the DC supply 22 and the auxiliary current supply 26, thereby avoiding duplication of components.

Operation of the arrangement 14 can best be described by first describing the topology of the core 16 in more detail. This is illustrated in FIG. 2.

Figure 2:
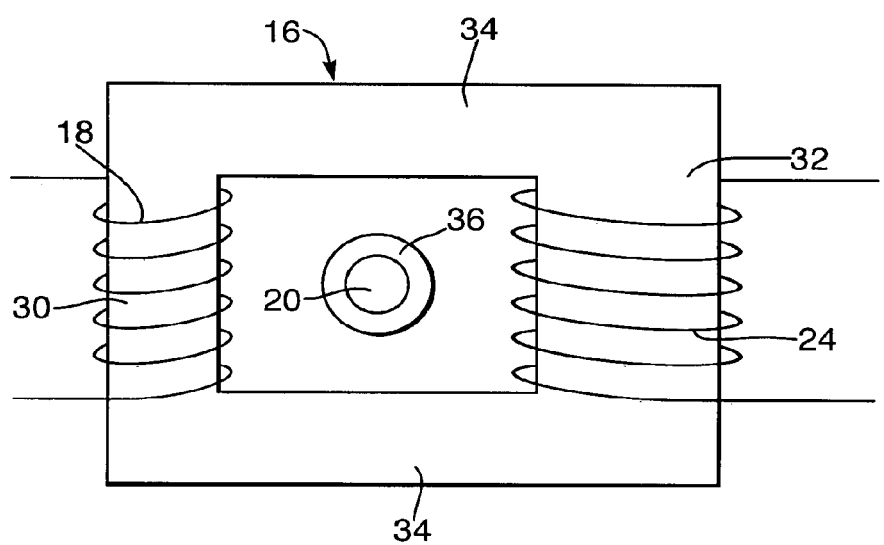
FIG. 2 is a simplified diagram of the core and winding topology of the system of FIG. 1.

In the example shown in FIG. 2, the core 16 forms a closed loop of iron, having a relatively thin arm 30 on which the primary winding 18 is wound, and a relatively thick arm 32 on which the auxiliary winding 24 is wound. The arms 30, 32 are connected by legs 34, so that the arms 30, 32 and legs 34 form a continuous loop for magnetic flux within the core 16. Accordingly, the primary winding 18 and the auxiliary winding 24 are coupled by the core 16 in the manner of a transformer.

The core 16 is also threaded by the coil 20. The coil 20 is preferably a superconducting coil. Accordingly, current created in the coil 20, by the supply 22, will be maintained with high efficiency, while the coil 20 remains superconducting. In order to maintain conditions for the coil 20 to remain superconducting without quenching, arrangements are provided in the form of a cryogenic tube 36 around the coil 20, so that the core 16 can be operated at ambient temperatures, while the coil 20 operates at cryogenic temperatures. Allowing the components other than the coil 20 to operate at ambient temperatures results in higher resistivity in those elements than would occur at cryogenic temperatures, with advantages which will become apparent from the following description.

Figure 3:
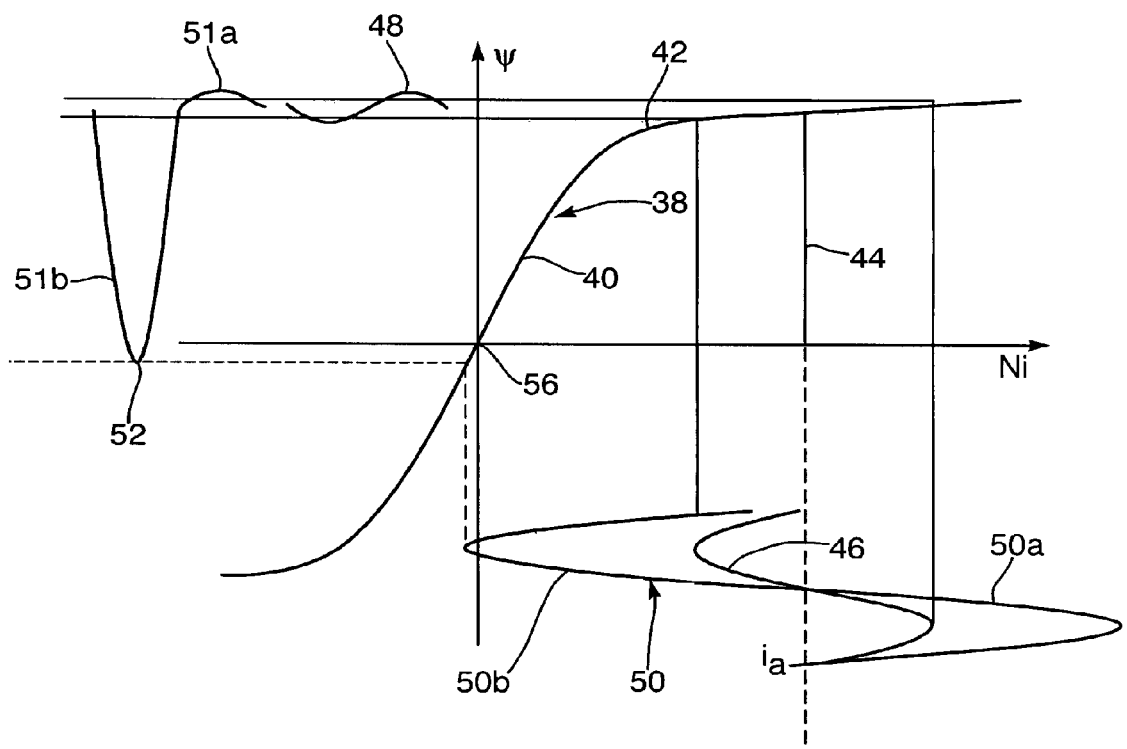
FIG. 3 is a plot of flux against current in the core of FIG. 2 in the absence of the auxiliary winding.

FIG. 3 illustrates the relationship between current and magnetic flux within the arrangement of FIG. 2, in the absence of the auxiliary winding 24, during normal use and also in fault conditions.

FIG. 3 plots, on the vertical axis, magnetic flux within the core 16, against (horizontal axis) the product of the number of turns of the primary winding 18 and the current in the primary winding 18. This characteristic 38 has a shape which is initially substantially linear at 40, reaching saturation at 42, so that flux increases much more slowly with increasing winding current, after saturation 42.

The effect of current in the coil 20, which is also coupled with the core 16, is to induce magnetic flux in the core 16. The current in the coil 20 is DC, so that the flux in the core 16 operates at a DC bias set by the current in the coil 20. The DC bias is sufficient to saturate the core 16. That is, the bias flux is beyond the saturation point 42. This is illustrated at 44. Accordingly, the effect of the current in the primary winding 18 on the flux in the core leg 30, during non-fault conditions, is equivalent to superimposing the normal current $i_a$ 46 on a DC bias current represented by 44. Since the core leg 30 is saturated, the current 46 results in only a small fluctuation 48 in the induced magnetic flux in the core 16. This leads to a small voltage drop across the arrangement 14 within the system 10, because the device voltage for an inductive arrangement such as the primary winding 18 is proportional to the rate of change of magnetic flux enclosed within the winding 18. Accordingly, in the absence of further arrangements to be described, the small fluctuations 48 would result in a power loss within the arrangement 14. In particular, some of this power loss would impose a load on the cryogenic arrangements 36. The losses may also affect voltage regulation within the primary circuit.

The auxiliary winding 24, in conjunction with the auxiliary current source 26 and detector 28 are used to provide compensation for this voltage loss, in the following manner. The auxiliary current source 26 is set to operate in response to changes at the primary winding 18, detected by the detector 28, in order to compensate for those changes and provide a feedback arrangement which maintains a substantially constant magnetic flux within the core 16, compensating for the relatively small changes in flux induced by the changes of current within the primary winding 18.

This indicates the significance of the different sizes of the arms 30, 32. The thin arm 30 can be maintained beyond saturation 42 without the thick arm 32 being saturated and this, in turn, allows the auxiliary winding 24 to be used to change the flux in the arm 32, to maintain the thin arm 30 in a saturated state.

Accordingly, during non-fault conditions, the operation of the auxiliary winding 24 seeks to maintain the flux in the core 16 at the bias level corresponding with the DC bias 44, substantially at all times. This reduces, minimises or eliminates the voltage drop across the arrangement 14, in non-fault conditions.

When fault conditions arise, high fault currents can be expected to arise, as noted above and as illustrated at 50 (FIG. 3). The magnitude of the AC fault current 50 is much greater than the magnitude of the current i a in non-fault conditions. However, since the DC bias 44 is beyond the saturation point 42, one half cycle 50a of the fault current 50 results in little additional flux 51a in the core 16 and thus results in relatively little voltage drop across the arrangement 14, and thus relatively little limitation of the fault current 50. However, the other half cycle 50b of the fault current 50 takes the core 16 below the saturation point 42, resulting in a much greater change 51b in the flux, to reduce the flux significantly and thus give rise to a significant voltage drop 52 across the device. This causes limitation of the fault current, but only during the half cycle 50b.

In the example being described, this ability to limit fault current is improved by incorporating a second detector 54, illustrated schematically in FIG. 1, to detect fault conditions in the system 10 and to control the DC current supply 22 so that, in the event of fault conditions arising, the DC current supply 22 is switched so that the current in the coil 20 is no longer maintained. The supply 22 may be open circuited, but preferably the supply 22 is able to dissipate the current in the coil 20, thereby reducing the coil current towards zero. This rapidly removes the DC bias 44, resulting in the core 16 operating about the origin 56 of the characteristic 38, so that both half cycles of the fault current give rise to significant flux within the core 16 and therefore significant voltage drops across the arrangement 14. This converts the arrangement 14, during fault conditions, to an inductive fault current limiter.

In addition, rapid removal of the DC bias current in the coil 20 also protects the superconducting coil 20 from being quenched to a non-superconducting state by high currents induced in the coil 20 by fault currents in the primary winding 18, or by high magnetic fields arising in a similar manner.

A further current limiting effect is available within the arrangement 14, during fault conditions detected by the detector 54. In this example, the auxiliary current source 26 is connected with the auxiliary winding 24 through switches 58, which can be switched to disconnect the auxiliary current source 26 from the winding 24, simultaneously connecting a resistance 60 in series with the auxiliary winding 24. This is done in response to the onset of fault conditions, when the auxiliary current source 26 is no longer required to maintain the core flux at the DC bias level 44, as has been described.

When the resistance 60 is in circuit with the auxiliary winding 24, the transformer provided by the core 16, primary winding 18 and auxiliary winding 24 results in the resistance 60 appearing as a series resistance in the conductor 11, having a value $(N_p^2/N_a^2)R$, where $N_p$ is the number of turns of the primary winding 18, $N_a$ is the number of turns of the auxiliary winding 24 and R is the value of the resistance 60. Thus, the resistance 60 also provides resistive fault current limitation in the conductor 11.

FIG. 4 illustrates a further example system 10a having many features equivalent with features described above in relation to FIG. 1. Accordingly, corresponding figures are given the same reference numerals in FIG. 5 as in FIG. 1, with a letter suffix a, b etc. The system 10a is a three phase alternating current system of conductors 11a, b, c of the three phases, between terminals 12a, 12b, 12c. Each phase of the system 10a has a fault current limiting arrangement 14a, including a core 16a, primary winding 18a, coil 20a, DC current supply 22a, auxiliary winding 24a, auxiliary current source 26a, and detector 28a. In addition, each phase has switches 58a and resistance 60a. Accordingly, each phase has the structure to allow operation in the manner described above.

In addition, a further control arrangement 70 is provided. The control arrangement 70 is common to the three phases, receives inputs from the three detectors 28a and provides control signals to the three auxiliary current sources 26a. The control arrangement 70 operates to control the auxiliary current sources 26a for the purposes described above, particularly to adjust the auxiliary current sources 26a in response to changes at the primary winding 18a of the corresponding phase, to apply control to the primary winding 18a by control of the flux within the primary winding 18a. Thus, each phase of the system 10a can be controlled in the manner described above. In addition, the control arrangement 70 is operable to provide control of reactive power within the three phase system 10a. Control of reactive power is commonly referred to as VAR control or VAR compensation. In the system 10a, the detectors 28a are used to measure voltage and current at the primary winding 18a of the corresponding phase, so that the control arrangement 70 has information about all three phases. Consequently, the control arrangement 70 is able to adjust the output of any of the auxiliary current sources 26a, independently of the sources 26a of the other phases, in order to change the DC bias position at which the phase is operating. This allows a change of magnetic flux to be created within the core of the corresponding phase, thus creating a change of voltage across the primary winding of the corresponding phase. This in turn gives rise to VAR compensation between the three phases.

Many variations and modifications can be made to the examples described above, without departing from the scope of the present invention. For example, the coils 20, 20a have been described as superconducting. Superconducting coils provide efficient supply of a DC bias current for the reasons described, but non-superconducting arrangements could alternatively be used. The ability of the examples to control the DC bias level, to remove the DC bias level in fault conditions, to achieve VAR compensation between phases and to create a resistive fault current limiter by switching a resistance into circuit with the auxiliary winding can each be used alone or in various combinations with the other features.

We claim:

1. A fault current limiting arrangement, comprising:
   a primary circuit for current to be limited in the event of a fault,
   a core having a primary winding forming part of the primary circuit;
   a coil coupled with the core;
   a DC current supply for the coil to provide a bias level of flux in the core during use;
   an auxiliary winding coupled with the core;
   an auxiliary current source for the auxiliary winding; and means to adjust the output of the auxiliary current source in response to changes at the primary winding to apply control to the primary winding by control of the flux within the primary winding, wherein the auxiliary current source is constructed and arranged to control the auxiliary current to maintain substantially constant flux within the primary winding, during use, except during fault conditions.

2. An arrangement according to claim 1 wherein the coil comprises a superconducting element.

3. An arrangement according to claim 1 wherein the coil DC current supply is constructed and arranged to set the coil current to saturate the core during use.

4. An arrangement according to claim 1 wherein the coil DC current supply is constructed and arranged to change the coil current in response to a fault condition occurring in the primary circuit during use.

5. An arrangement according to claim 4 wherein the coil DC current supply is constructed and arranged to remove the coil current in response to a fault condition during use.

6. An arrangement according to claim 1, wherein the primary circuit is connected with one phase of a multi-phase electrical system, the auxiliary current source being constructed and arranged to control the auxiliary current to change the primary winding flux, thereby to provide VAR compensation during use.

7. An arrangement according to claim 1, wherein the auxiliary winding forms an auxiliary circuit, the auxiliary circuit includes an impedance and switches for switching the impedance into the auxiliary circuit during fault conditions.

8. An arrangement according to claim 1, wherein the core has a relatively thin arm on which the primary winding is wound, and a relatively thick arm on which the auxiliary winding is wound, when said arms are compared to each other.

9. An arrangement according to claim 8, wherein the coil is constructed and arranged so that, in use, the bias level of flux provided by the coil is sufficient to saturate the relatively thin arm and is insufficient to saturate the relatively thick arm in the presence of current in the primary or auxiliary windings.

10. A method of fault current limiting in which a core is provided having a primary winding forming part of a primary circuit and a coil is coupled with the core, the method comprising:
    providing the coil with DC current to provide a bias level of flux in the core;
    providing current to an auxiliary winding coupled with the core; and
    adjusting the current provided to the auxiliary winding in response to changes at the primary winding to apply control to the primary winding by control of the flux within the primary winding, and controlling the auxiliary winding current to maintain substantially constant flux within the primary winding except during fault conditions.

11. A method according to claim 10, wherein the coil comprises a superconducting element.

12. A method according to claim 10, wherein the coil current supply sets the coil current to saturate the core.

13. A method according to claim 10, further comprising changing the coil current in response to a fault condition occurring in the primary circuit.

14. A method according to claim 10, further comprising removing the coil current in response to a fault condition.

15. A method according to claim 10, wherein the primary circuit is connected with one phase of a multi-phase electrical system, and using the auxiliary winding current to control the auxiliary current to change the primary winding flux, thereby to provide VAR compensation.

16. A method according to claim 10, wherein the means to adjust the output of the auxiliary current source comprises a controller.

17. A method according to claim 10, wherein the means to adjust the output of the auxiliary current source comprises a switch.

\* \* \* \* \*